US010518744B2

(12) United States Patent
Miida et al.

(10) Patent No.: US 10,518,744 B2
(45) Date of Patent: Dec. 31, 2019

(54) WEBBING TAKE-UP DEVICE

(71) Applicant: KABUSHIKI KAISHA TOKAI-RIKA-DENKI-SEISAKUSHO, Aichi (JP)

(72) Inventors: Kosuke Miida, Aichi (JP); Akira Sumiyashiki, Aichi (JP); Kaoru Yuasa, Aichi (JP); Wataru Yanagawa, Aichi (JP)

(73) Assignee: KABUSHIKI KAISHA TOKAI-RIKA-DENKI-SEISAKUSHO, Aichi-Ken (JP)

( * ) Notice: Subject to any disclaimer, the term of this patent is extended or adjusted under 35 U.S.C. 154(b) by 231 days.

(21) Appl. No.: 15/561,811

(22) PCT Filed: Mar. 28, 2016

(86) PCT No.: PCT/JP2016/059982
§ 371 (c)(1),
(2) Date: Sep. 26, 2017

(87) PCT Pub. No.: WO2016/163265
PCT Pub. Date: Oct. 13, 2016

(65) Prior Publication Data
US 2018/0118157 A1    May 3, 2018

(30) Foreign Application Priority Data

Apr. 6, 2015  (JP) .................................. 2015-077660

(51) Int. Cl.
*B60R 22/46* (2006.01)

(52) U.S. Cl.
CPC ...... *B60R 22/4676* (2013.01); *B60R 22/4628* (2013.01); *B60R 2022/468* (2013.01);
(Continued)

(58) Field of Classification Search
CPC .. B60R 22/46; B60R 22/4628; B60R 22/4676
See application file for complete search history.

(56) References Cited

U.S. PATENT DOCUMENTS

| | | | |
|---|---|---|---|
| 6,616,081 B1* | 9/2003 | Clute | B60R 22/3413 242/379.1 |
| 2007/0001047 A1* | 1/2007 | Yasuda | B60R 22/3413 242/379.1 |
| 2008/0203210 A1* | 8/2008 | Nagata | B60R 22/4676 242/396.1 |

FOREIGN PATENT DOCUMENTS

| | | |
|---|---|---|
| JP | 2003-502204 A | 1/2003 |
| JP | 2008-213538 A | 9/2008 |

(Continued)

OTHER PUBLICATIONS

International Search Report issued in a corresponding application PCT/JP2016/059982 dated Apr. 19, 2016.
(Continued)

*Primary Examiner* — Sang K Kim
(74) *Attorney, Agent, or Firm* — Roberts Mlotkowski Safran Cole & Calderon P.C.

(57) ABSTRACT

A webbing take-up device includes a spool, a lock gear that restricts pull-out direction rotation of the spool, a force limiter mechanism that permits pull-out direction rotation of the spool at or above a force limiter load, and a pawl that switches the force limiter load. The webbing take-up device further includes a cylinder section that includes a first cylindrical portion and a second cylindrical portion, a gas generator that supplies gas into the second cylindrical portion, and a piston section that is moved along the first cylindrical portion by an increase in pressure inside the second cylindrical portion and the first cylindrical portion so as to press and displace the pawl. An axial center of the second cylindrical portion is disposed offset with respect to (Continued)

an axial center of the first cylindrical portion, and an abutted portion that is abutted by the piston section is provided at a boundary between the first cylindrical portion and the second cylindrical portion.

4 Claims, 13 Drawing Sheets

(52) U.S. Cl.
CPC ............... *B60R 2022/4638* (2013.01); *B60R 2022/4685* (2013.01)

(56) References Cited

FOREIGN PATENT DOCUMENTS

| | | |
|---|---|---|
| JP | 2012-030698 A | 2/2012 |
| JP | 2013-216160 A | 10/2013 |

OTHER PUBLICATIONS

Office Action issued in the corresponding Japanese patent application No. 2015-077660 dated Dec. 19, 2017.

\* cited by examiner

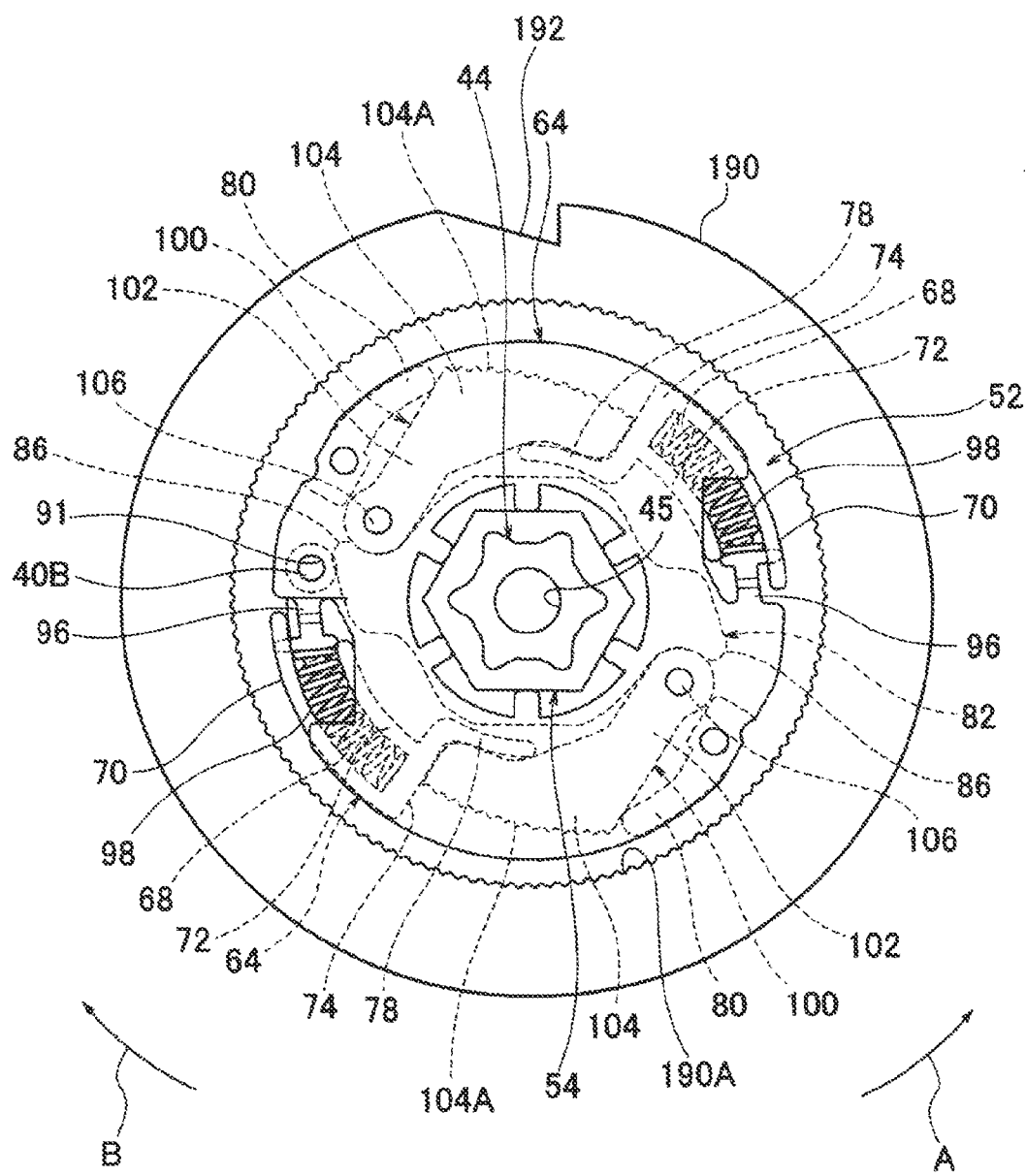

WEBBING TAKE-UP DEVICE

CROSS-REFERENCE TO RELATED APPLICATIONS

The present application is a U.S. National Phase of PCT/JP2016/059982 filed on Mar. 28, 2016 claiming priority to Japanese Patent Application No. 2015-077660 filed Apr. 6, 2015. The disclosure of the PCT Application is hereby incorporated by reference into the present Application.

TECHNICAL FIELD

The present invention relates to a webbing take-up device that permits pull-out direction rotation of a spool at or above a force limiter load when pull-out direction rotation of the spool is restricted by a lock section.

BACKGROUND ART

Japanese National-Phase Publication No. 2003-502204 describes a webbing take-up device in which a force limiter load is switched by actuating a drive device. The drive device configures a portion of the webbing take-up device, and is configured including a tube-shaped cylinder section, a gas generator attached to an end portion on one side of the cylinder section, and a piston section disposed inside the cylinder section. The piston section moves inside the cylinder section under the pressure of gas generated by the gas generator, and the piston section presses a stepped portion of an operation ring to switch the force limiter load.

SUMMARY OF INVENTION

Technical Problem

However, were an initial capacity (the volume of a space between the gas generator and the piston section prior to actuation) of the inside of the cylinder section that the gas generator fills with gas to be inconsistent, it is conceivable that an actuation force of the piston section could also become inconsistent.

In consideration of the above circumstances, an object of the present invention is to obtain a webbing take-up device capable of raising the consistency of an actuation force of a piston section.

Solution to Problem

A webbing take-up device of a first aspect of the present invention includes a spool, a lock section, a force limiter mechanism, a switching member, a cylinder section, a gas generator, and a piston section. A webbing worn by an occupant is taken up on the spool, and the spool is rotated in a pull-out direction by the webbing being pulled out. The lock section restricts pull-out direction rotation of the spool in a vehicle emergency. The force limiter mechanism permits pull-out direction rotation of the spool at or above a force limiter load when the lock section has restricted pull-out direction rotation of the spool. The switching member switches the force limiter load by being displaced. The cylinder section includes a first cylindrical portion formed in a cylinder shape, a second cylindrical portion having an axial center disposed offset with respect to an axial center of the first cylindrical portion, the second cylindrical portion being in communication with the first cylindrical portion, and an abutted portion provided at a boundary between the first cylindrical portion and the second cylindrical portion. The gas generator is actuated to supply gas into the second cylindrical portion. The piston section is disposed inside the first cylindrical portion in a state abutted against the abutted portion, is moved along the first cylindrical portion by the gas generator being actuated and pressure inside the second cylindrical portion and the first cylindrical portion increasing, and presses and displaces the switching member.

A webbing take-up device of a second aspect of the present invention is the webbing take-up device of the first aspect, wherein a sealing member that forms a seal between the piston section and the first cylindrical portion, and that is formed using an elastic material, is attached to an outer peripheral portion of the piston section. Moreover, the piston section is tapered at a location of the piston section closer to the abutted portion side than a portion to which the sealing member is attached.

A webbing take-up device of a third aspect of the present invention is the webbing take-up device of either the first aspect or the second aspect, wherein an outer peripheral portion of the piston section is formed with a recessed groove, into which a sealing member that forms a seal between the piston section and the first cylindrical portion, and that is formed using an elastic material, is fitted. Moreover, the piston section is provided with a communication portion closer to the abutted portion side than a location formed with the recessed groove, the communication portion being in communication with the recessed groove and allowing gas from the gas generator to pass through.

Advantageous Effects of Invention

In the webbing take-up device of the first aspect of the present invention, the webbing worn by the occupant is taken up onto the spool. The webbing is worn by the occupant by pulling the webbing out from the spool. Moreover, in a vehicle emergency, pull-out direction rotation of the spool is locked by the lock section. In this state, when the webbing is pulled in the pull-out direction such that a load acting on the spool reaches the force limiter load or greater, pull-out direction rotation of the spool is permitted.

Moreover, in the webbing take-up device of the present invention, when the gas generator is actuated and gas generated by the gas generator is supplied into the second cylindrical portion of the piston section, the pressure inside the second cylindrical portion and inside the first cylindrical portion that is in communication with the second cylindrical portion rises. The piston section provided inside the first cylindrical portion is thus moved along the inside of the first cylindrical portion. The piston section that has moved then presses and displaces the switching member, thereby switching the force limiter load.

Note that in the webbing take-up device of the present invention, the piston section is disposed inside the first cylindrical portion in a state abutted against the abutted portion provided at the boundary between the first cylindrical portion and the second cylindrical portion in the cylinder section. Disposing the piston section in this manner makes the volume of a space between the piston section and the gas generator inside the cylinder section more consistent, and thus makes pressure increase characteristics inside the cylinder section on actuation of the gas generator more consistent. This thereby enables an actuation force of the piston section to be made consistent.

In the webbing take-up device of the second aspect of the present invention, the piston section is formed so as to taper on progression toward the abutted portion side at the location of the piston section closer to the abutted portion side of the cylinder section than the portion to which the sealing member is attached. Accordingly, gas from the gas generator that has flowed from the second cylindrical portion into the first cylindrical portion can flow swiftly toward the side of the sealing member, thereby enabling the speed of the pressure increase in the vicinity of the sealing member to be accelerated. As a result, it is possible to swiftly deform the sealing member when the gas generator is actuated, enabling the gas sealing properties of the sealing member to be raised.

In the webbing take-up device of the third aspect of the present invention, gas from the gas generator that has flowed from the second cylindrical portion into the first cylindrical portion can flow swiftly through the communication portion provided to the piston section and into the recessed groove into which the sealing member is fitted. This thereby enables the speed of the pressure increase in the vicinity of the sealing member to be accelerated. As a result, it is possible to swiftly deform the sealing member when the gas generator is actuated, enabling the gas sealing properties of the sealing member to be raised.

BRIEF DESCRIPTION OF DRAWINGS

FIG. 4 is a front view of the clutch mechanism of the webbing take-up device illustrated in FIG. 2 and FIG. 3, as viewed from the opposite side to the spool.

DESCRIPTION OF EMBODIMENTS

Explanation follows regarding a webbing take-up device according to an exemplary embodiment of the present invention, with reference to FIG. 1 to FIGS. 12.

Figure 1:
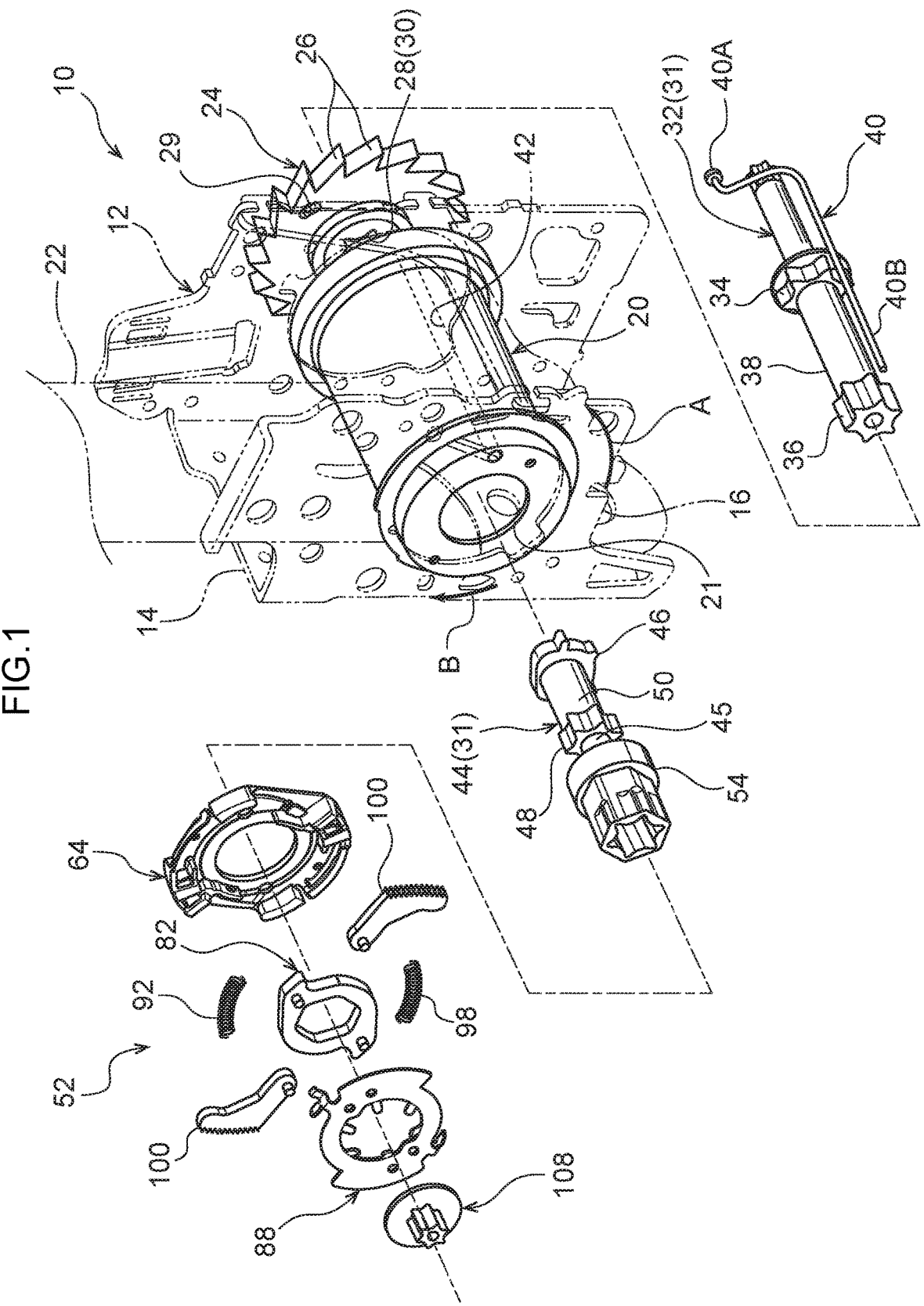
FIG. 1 is an exploded perspective view illustrating configuration of relevant portions of a webbing take-up device according to an exemplary embodiment of the present invention.
Figure 6:
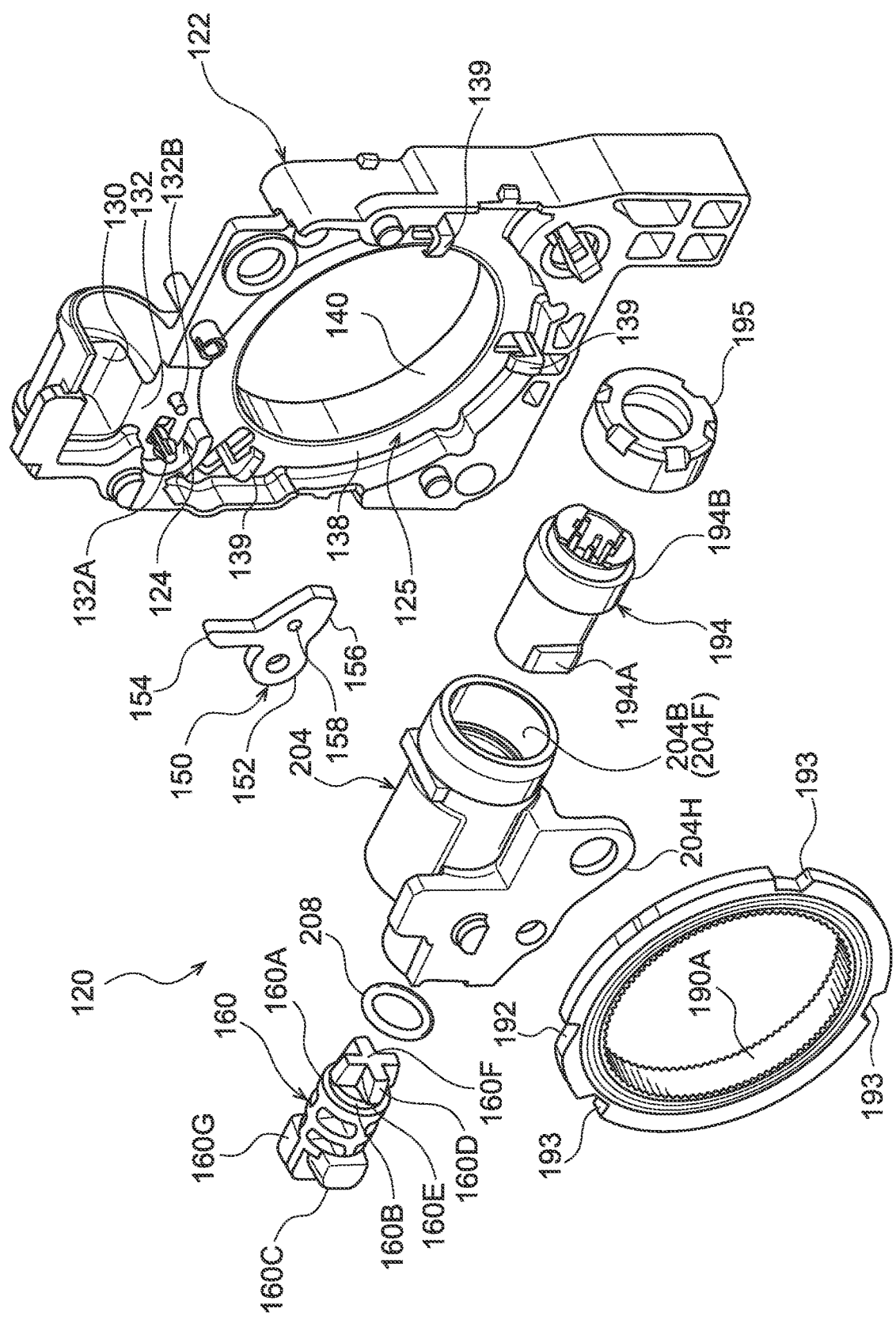
FIG. 6 is an exploded perspective view illustrating a force limiter load-switching mechanism of the webbing take-up device illustrated in FIG. 1.

As illustrated in FIG. 1, a webbing take-up device 10 according to an exemplary embodiment of the present invention includes a frame 12, a spool 20, a webbing 22, a lock gear 24 serving as a lock section, a main torsion shaft 32 configuring a force limiter mechanism 31, a trigger wire 40, a sub torsion shaft 44, and a clutch mechanism 52. Moreover, as illustrated in FIG. 6, the webbing take-up device 10 further includes a force limiter load-switching mechanism 120. First, explanation follows regarding the frame 12, followed by explanation regarding the spool 20, the webbing 22, the lock gear 24, the main torsion shaft 32, the trigger wire 40, the sub torsion shaft 44, the clutch mechanism 52, and the force limiter load-switching mechanism 120 in turn.

As illustrated in FIG. 1, the frame 12 includes a plate shaped back plate 14 that is formed with a substantially concave shape in plan view and that is fixed to a vehicle body. Leg plates 16, 18 extend out substantially perpendicularly from both width direction end portions of the back plate 14. A known lock mechanism (not illustrated in the drawings) is attached to the outside of the leg plate 18.

The spool 20 is formed in a circular cylinder shape formed with a through hole 21 penetrating along the axial direction, and the spool 20 is disposed between the leg plate 16 and the leg plate 18 of the frame 12. The spool 20 is disposed in a state in which the axial direction of the spool 20 runs in the direction in which the leg plate 16 and the leg plate 18 face each other, and the spool 20 is rotatably supported by the frame 12 through the main torsion shaft 32, the sub torsion shaft 44, and the like, described later.

The webbing 22 is worn over the body of an occupant. A base end portion of the webbing 22, this being one length direction end portion of the webbing 22, is anchored to the spool 20. The spool 20 is configured to take up and store the webbing 22 from the base end side when the spool 20 rotates in a take-up direction (the arrow A direction in FIG. 1, etc.), this being one rotation direction.

The lock gear 24 is disposed on one axial direction side of the spool 20 so as to be coaxial to the spool 20. An outer peripheral portion of the lock gear 24 is formed with gear portions 26. An axial center portion of the lock gear 24 is formed with a through hole 28 penetrating the lock gear 24 in the axial direction, and an inner peripheral portion of the through hole 28 is formed with a spline shaped engaged portion 30.

The lock gear 24 engages with a locking member (not illustrated in the drawings) when the vehicle decelerates sharply, or when the spool 20 rotates suddenly in a pull-out direction. As a result, rotation of the lock gear 24 in the pull-out direction (arrow B direction in FIG. 1 etc.) is restricted (locked), thereby restricting rotation of the spool 20 in the pull-out direction.

The main torsion shaft 32 is disposed coaxially to the spool 20 and the lock gear 24, and is inserted through each of the through hole 21 of the spool 20 and the through hole 28 of the lock gear 24. The main torsion shaft 32 is formed with a spline shaped first engaging portion 34 at a length direction central portion, and is similarly formed with a spline shaped second engaging portion 36 at a leading end portion. The first engaging portion 34 engages with the engaged portion 30 of the lock gear 24, thus fixing the main torsion shaft 32 to the lock gear 24 so as to be capable of rotating as a unit together with the lock gear 24. The second engaging portion 36 engages with an engaged portion, not illustrated in the drawings, formed at an axial direction intermediate portion of an inner peripheral portion of the spool 20, thus fixing the main torsion shaft 32 so as to be capable of rotating as a unit together with the spool 20. A portion of the main torsion shaft 32 between the first engaging portion 34 and the second engaging portion 36 configures a first energy absorption section 38 that absorbs kinetic energy of the occupant pulling on the webbing 22, as described later.

A base end portion 40A of the trigger wire 40 is inserted into a hole 29 formed in the lock gear 24 at a position closer to a radial direction outside than the through hole 28, thereby anchoring the trigger wire 40 to the lock gear 24. To leading end side of the base end portion 40A, the trigger wire 40 is inserted into a hole 42 formed alongside the through hole 21 in the spool 20. A leading end portion 40B of the trigger wire 40 projects out from the spool 20 toward another axial direction side.

The sub torsion shaft 44 is disposed coaxially to the main torsion shaft 32, and the sub torsion shaft 44 is inserted into the through hole 21 in the spool 20 closer to a base end side than a length direction central portion of the sub torsion shaft 44. To a leading end side of the length direction central portion of the sub torsion shaft 44, the sub torsion shaft 44 projects out from the spool 20 toward the other axial direction side. An at least partially spline shaped first engaging portion 46 is formed at a base end portion of the sub torsion shaft 44, and a spline shaped second engaging portion 48 is similarly formed to a leading end portion of the sub torsion shaft 44. The first engaging portion 46 engages with an engaged portion, not illustrated in the drawings, formed at the axial direction intermediate portion of the inner peripheral portion of the spool 20, thereby fixing the sub torsion shaft 44 so as to be capable of rotating as a unit together with the spool 20. A portion of the sub torsion shaft 44 between the first engaging portion 46 and the second engaging portion 48 configures a second energy absorption section 50 that absorbs kinetic energy of the occupant pulling on the webbing 22, as described later.

Figure 2:
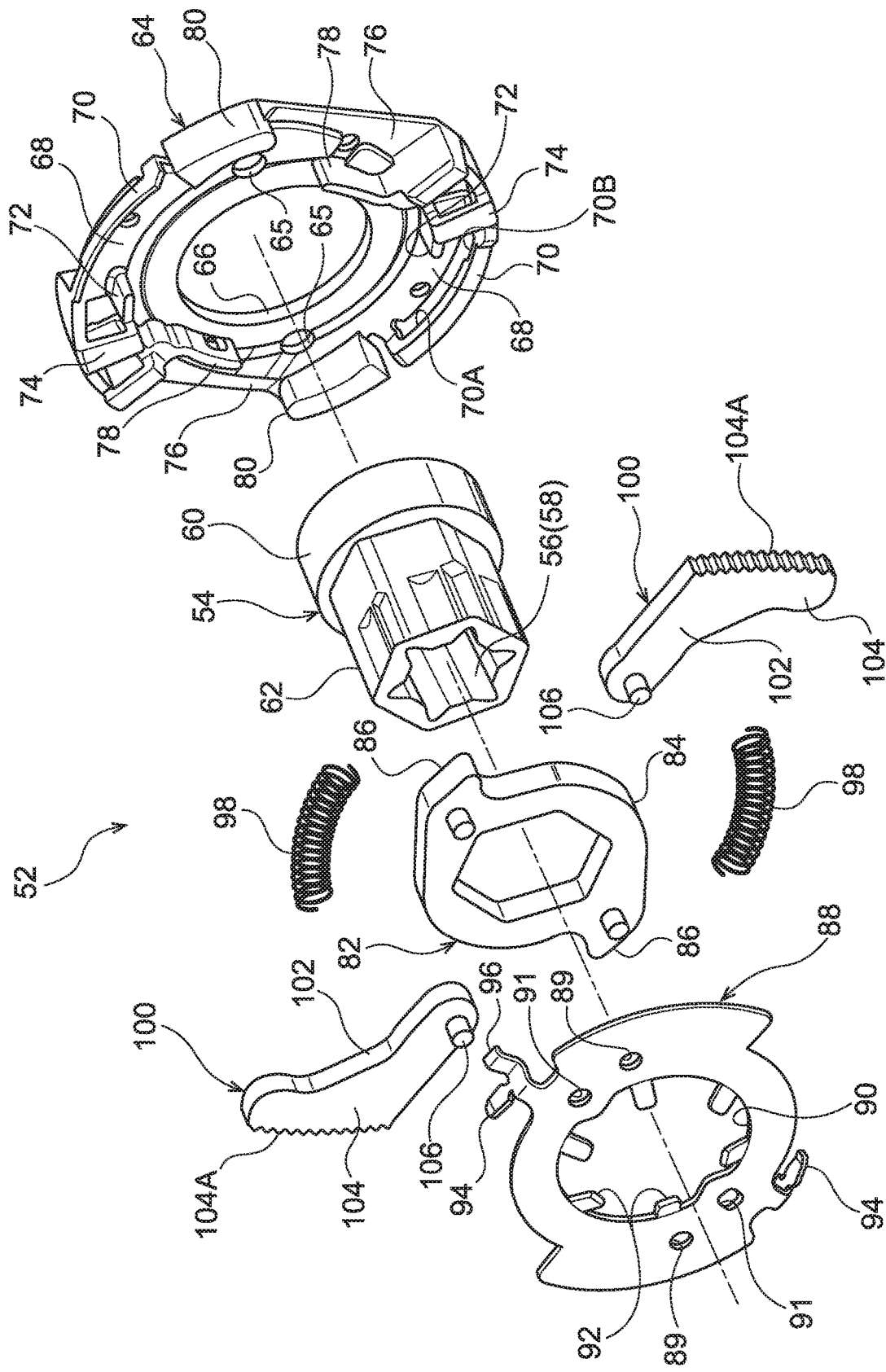
FIG. 2 is an exploded perspective view illustrating configuration of a clutch mechanism of the webbing take-up device illustrated in FIG. 1.
Figure 3:
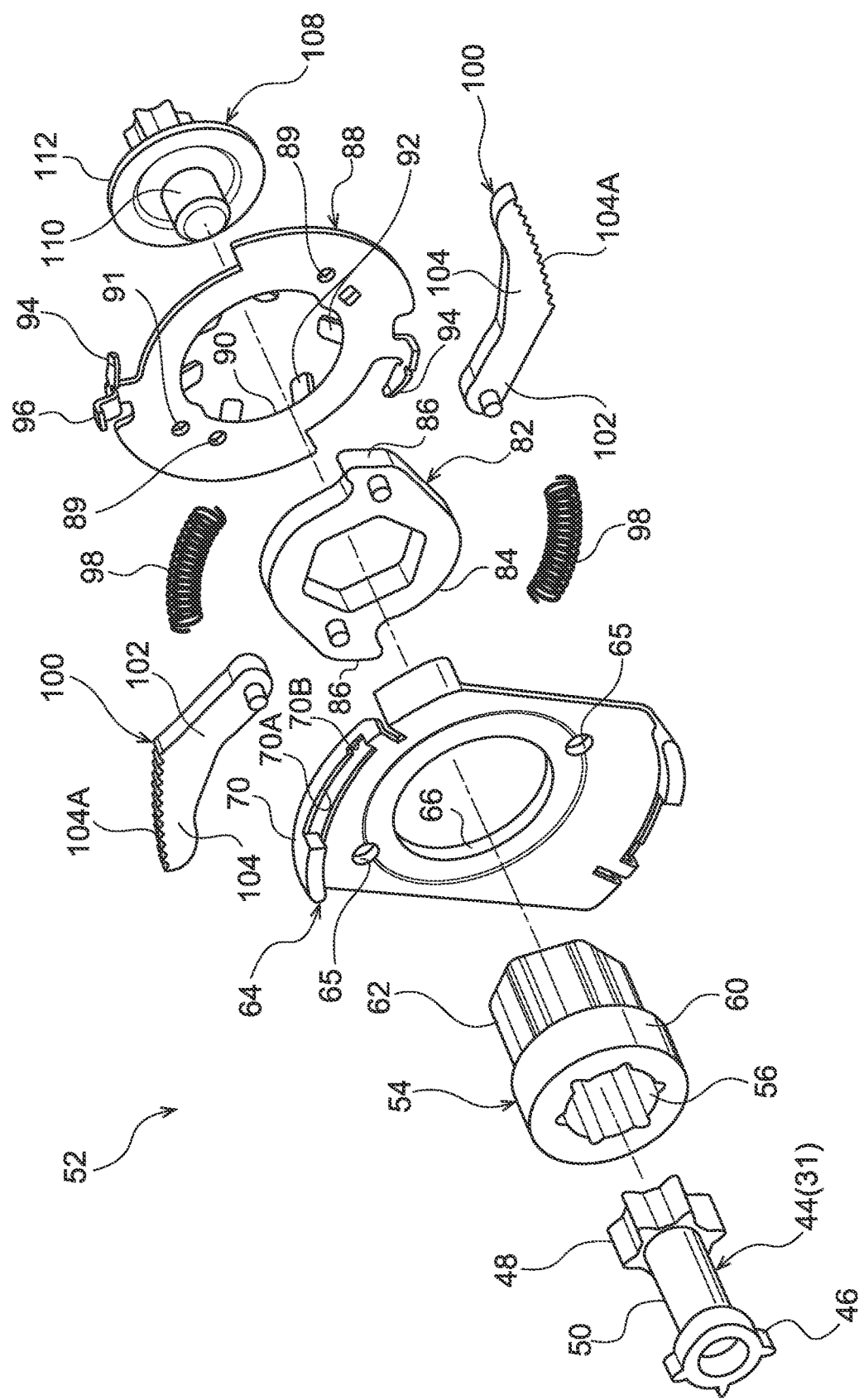
FIG. 3 is an exploded perspective view of the clutch mechanism of the webbing take-up device illustrated in FIG. 1, as viewed from the opposite side to a spool.
Figure 5A:
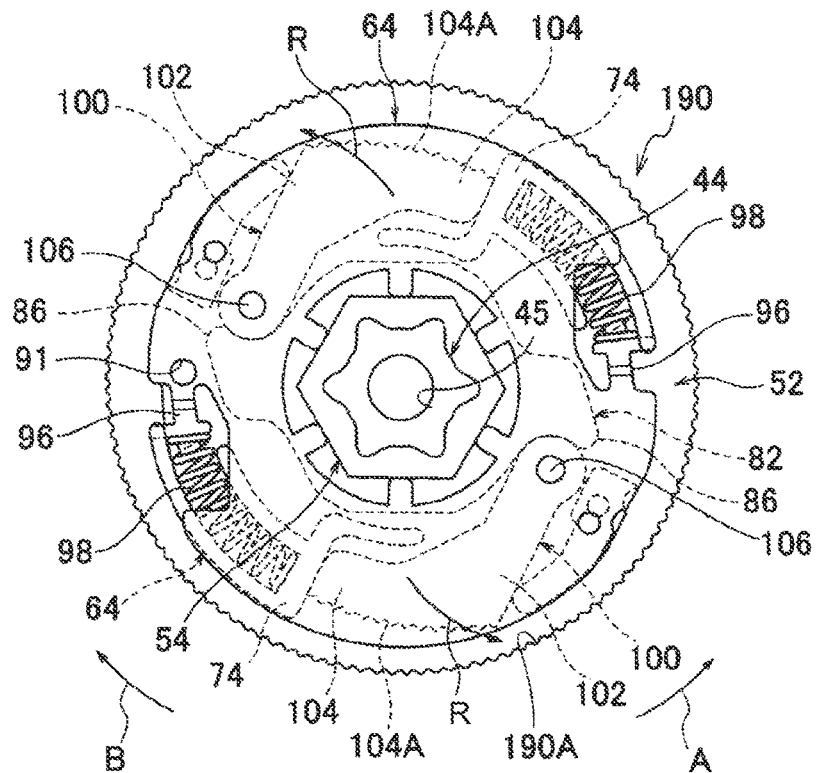
FIG. 5A is a diagram illustrating a state in which clutch plates of the clutch mechanism illustrated in FIG. 4 have begun to swing toward the side of a lock ring.
Figure 5B:
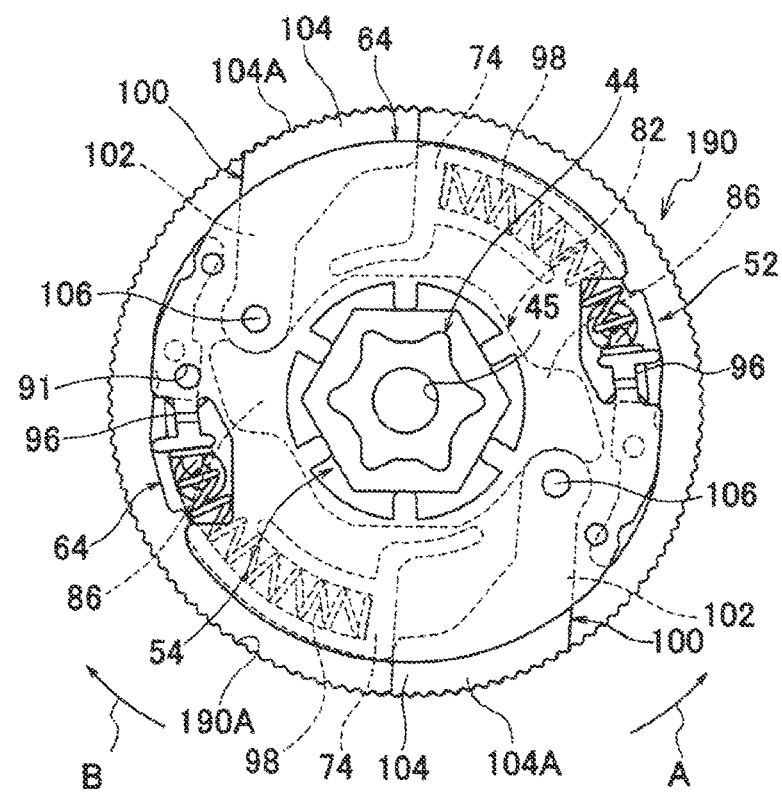
FIG. 5B is a diagram illustrating a state in which the clutch plates illustrated in FIG. 4 have meshed together with the lock ring.

As illustrated in FIG. 2 and FIG. 3, the clutch mechanism 52 includes a sleeve 54, a clutch guide 64, a clutch base 82, a clutch cover 88, a pair of clutch plates 100, a screw 108, and a pair of coil springs 98. Note that FIG. 5A illustrates a mid-actuation state of the clutch mechanism 52, and FIG. 5B illustrates a state in which actuation of the clutch mechanism 52 has completed.

As illustrated in FIG. 3, the sleeve 54 is disposed coaxially to the sub torsion shaft 44. An axial center portion of the sleeve 54 is formed with a through hole 56 penetrating the sleeve 54 in an axial direction. The sub torsion shaft 44 described above is inserted into the through hole 56 with play between the sub torsion shaft 44 and the through hole 56. Moreover, as illustrated in FIG. 2, a spline shaped engaged portion 58 is formed in a leading end side of an inner peripheral portion of the sleeve 54. The second engaging portion 48 (see FIG. 3) of the sub torsion shaft 44 engages with the engaged portion 58, thereby fixing the sleeve 54 so as to be capable of rotating as a unit together with the sub torsion shaft 44. A base end side of the sleeve 54 configures a support portion 60 with a circular outer profile, and to a leading end side of the support portion 60, the sleeve 54 configures a fitting portion 62 with a hexagonal outer profile.

The clutch guide 64 is made of a resin, and is formed in a ring shape penetrated in an axial direction by a through hole 66. The support portion 60 mentioned above is inserted into the through hole 66, thereby supporting the clutch guide 64 so as to be capable of rotating relative to the sleeve 54. A pair of coil spring housing portions 68 that house the coil springs 98 are formed at two positions in a circumferential direction of the clutch guide 64. The coil spring housing portions 68 are disposed with point symmetry to one another about the center of the clutch guide 64, and are each formed in a substantially J-shape and include an outside wall 70 and an inside wall 72 respectively extending along the circumferential direction of the clutch guide 64, and a coupling wall 74 extending in a radial direction of the clutch guide 64 and coupling together respective end portions of the outside wall 70 and the inside wall 72. Each outside wall 70 is formed with an elongated guide hole 70A with its length direction running along the circumferential direction.

The clutch guide 64 is further formed with a pair of clutch plate housing portions 76 that house the clutch plates 100. The clutch plate housing portions 76 are formed so as to be adjacent to the respective coil spring housing portions 68. Each clutch plate housing portion 76 includes a first support wall 78 extending from the coupling wall 74 toward the opposite side to the inside wall 72, and a second support wall 80 spaced away from the coupling wall 74 on the opposite side of the coupling wall 74 to the outside wall 70. The first support wall 78 and the second support wall 80 are provided standing out from the clutch plate housing portions 76.

The clutch base 82 is configured including a ring shaped fitted portion 84. The fitting portion 62 of the sleeve 54 is fitted (press-fitted) inside the fitted portion 84, thereby fixing the clutch base 82 to the sleeve 54 so as to be capable of rotating as a unit together with the sleeve 54. Note that in an alternative embodiment, the sleeve 54 and the clutch base 82 may be formed integrally to each other. The clutch base 82 is further formed with a pair of anchor portions 86 projecting out from the fitted portion 84 toward the outside. The anchor portions 86 are respectively anchored to base end portions of arms 102 formed to the clutch plates 100, described later.

The clutch cover 88 is disposed coaxially to the sleeve 54, and is disposed on the opposite side of the clutch guide 64 to the spool 20 in opposition with the clutch guide 64. The clutch cover 88 is formed in a ring shape with a through hole 90 penetrating in an axial direction, and plural fitting claws 92 are formed projecting out toward a radial direction inside at an inner peripheral portion of the clutch cover 88. The fitting portion 62 of the sleeve 54 is inserted into the through hole 90, and the plural fitting claws 92 engage with the fitting portion 62, thereby fixing the clutch cover 88 so as to be capable of rotating as a unit together with the sleeve 54, and thus with the sub torsion shaft 44.

Moreover, a pair of spring anchor claws 94 are provided to the clutch cover 88 at two positions in the circumferential direction of the clutch cover 88. The pair of spring anchor claws 94 are disposed with point symmetry about the center of the clutch cover 88. The pair of spring anchor claws 94 respectively anchor one end portion of each of the coil springs 98 disposed in the coil spring housing portions 68 of the clutch guide 64. A guide claw 96 is provided at an outer peripheral portion of one of the spring anchor claws 94. The guide claw 96 is disposed inside one of the guide holes 70A provided to the clutch guide 64, and moves along the guide hole 70A such that the clutch guide 64 is capable of rotating relative to the clutch cover 88 between an actuated position illustrated in FIG. 5B and a non-actuated position illustrated in FIG. 4.

As illustrated in FIG. 2, the clutch plates 100 are disposed between the clutch cover 88 and the clutch guide 64. Each of the clutch plates 100 includes an arm 102, and a circular arc portion 104 formed at a leading end portion of the arm 102. A base end portion of the arm 102 is formed with a swing shaft 106 that projects out toward the clutch cover 88 side and extends along the axial direction of the sub torsion shaft 44. The swing shaft 106 is inserted into a hole 89 formed in the clutch cover 88 such that the respective clutch plate 100 is supported by the clutch cover 88 so as to be capable of swinging. Moreover, an outer peripheral portion of the circular arc portion 104 (leading end portion of the clutch plate 100) is formed with knurled teeth 104A to give a spur gear profile.

As illustrated in FIG. 3, the screw 108 is configured including a threaded portion 110, and a retaining portion 112 that has a larger diameter than the threaded portion 110. The threaded portion 110 is screwed into a threaded hole 45 (see FIG. 1) formed in a leading end portion of the sub torsion shaft 44, thereby fixing the screw 108 to the leading end portion of the sub torsion shaft 44. In this manner, the retaining portion 112 is abutted against a leading end portion of the sleeve 54 in a state in which the screw 108 is fixed to the leading end portion of the sub torsion shaft 44. This thereby limits movement of the sleeve 54 in a direction that would cause the sleeve 54 to come out from the sub torsion shaft 44. Note that in this state, the clutch cover 88 and the spool 20 limit axial direction movement of the clutch guide 64.

As illustrated in FIG. 2 and FIG. 3, the clutch guide 64 and the clutch cover 88 described above are respectively formed with holes 65, 91. The holes 65, 91 are formed so as to oppose each other in a state in which the clutch guide 64 is disposed at the non-actuated position with respect to the clutch cover 88. The leading end portion 40B of the trigger wire 40 (see FIG. 1) is inserted through the respective holes 65, 91. This thereby limits rotation of the clutch guide 64 relative to the spool 20 and the clutch cover 88 in a state in which the clutch guide 64 is disposed at the non-actuated position (in which the clutch guide 64 is held at the non-actuated position).

Moreover, in a state in which the clutch guide 64 is being held at the non-actuated position as described above, the coil springs 98 are compressed between the coil spring housing portions 68 (coupling walls 74) of the clutch guide 64 and the spring anchor claws 94 of the clutch cover 88.

This state is a state in which a sufficient spacing is secured between the holes 89 in the clutch cover 88 (swing shafts 106 of the clutch plates 100) and the coupling walls 74 for the clutch plates 100 to be housed in the clutch plate housing portions 76, such that the knurled teeth 104A are stowed at the inside of an outer peripheral portion of the clutch guide 64. In this state, the coupling walls 74 abut leading ends of the circular arc portions 104.

Next, explanation follows regarding the force limiter load-switching mechanism 120, this being a relevant portion of the present exemplary embodiment.

Figure 7:
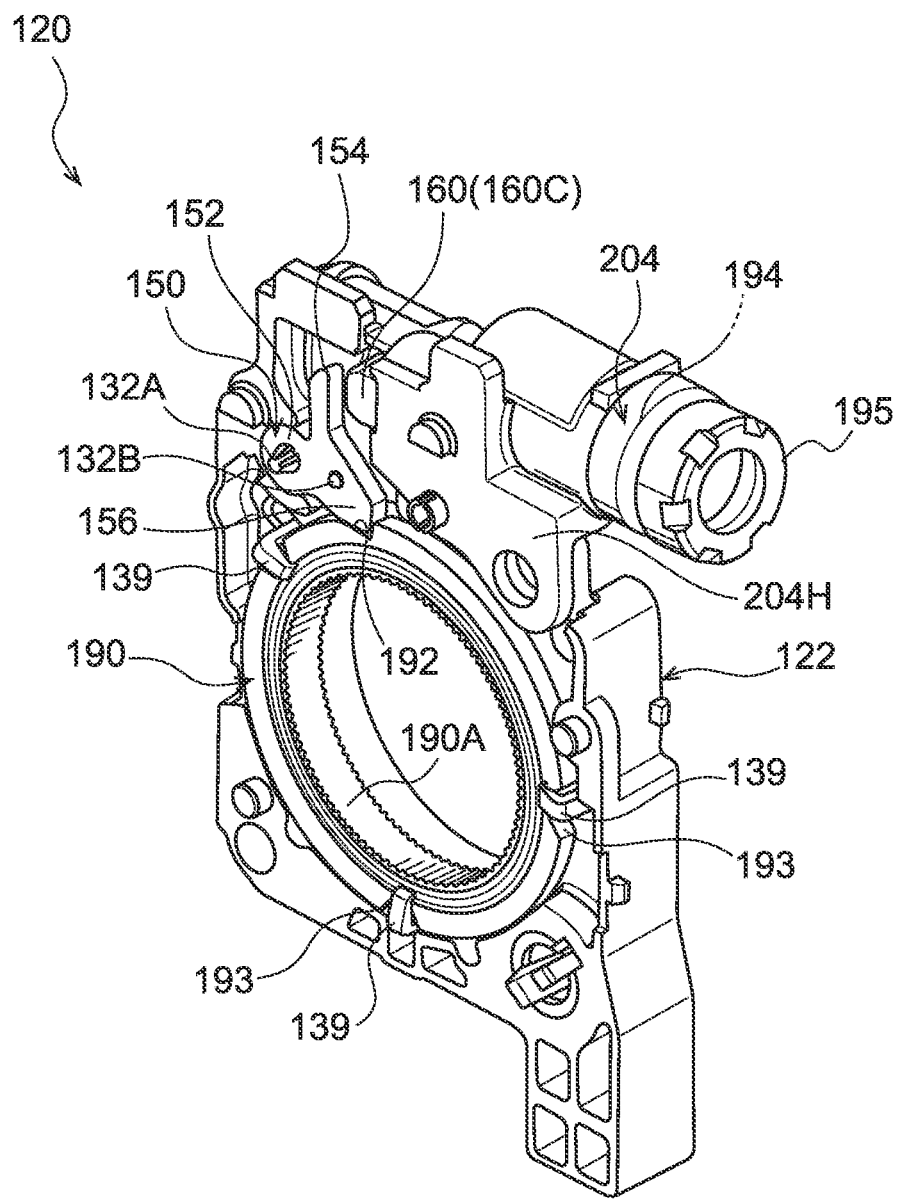
FIG. 7 is a perspective view illustrating a state on completion of assembly of the force limiter load-switching mechanism illustrated in FIG. 6.

As illustrated in FIG. 6 and FIG. 7, the force limiter load-switching mechanism 120 includes a body 122 formed in a box shape, a gas generator 194 serving as a gas generation device, a piston section 160 that actuates when subjected to pressure from gas generated by the gas generator 194, and a cylinder section 204 that internally houses part of the piston section 160. The force limiter load-switching mechanism 120 further includes a pawl 150, serving as a switching member, that is displaced by being pressed by the piston section 160, and a lock ring 190 that is restricted from rotating by the pawl 150 or has this rotation restriction released by the pawl 150.

The body 122 is formed using a resin material, and is formed so as to be open toward the side of the leg plate 16 of the frame 12 (see FIG. 1). Specifically, the body 122 includes the pawl 150, described later, a first housing portion 124 in which part of the piston section 160 is housed, and a second housing portion 125 in which the lock ring 190 is housed.

The first housing portion 124 is formed with a housing groove 130 that houses the piston section 160 such that the piston section 160 is capable of moving. The housing groove 130 is formed so as to be open toward the side of the leg plate 16 of the frame 12 (see FIG. 1). The first housing portion 124 is further formed with a recess 132 that houses the pawl 150 and that is connected to the housing groove 130 described above. The recess 132 is formed so as to be open toward the side of the leg plate 16 of the frame 12 (see FIG. 1). Moreover, the recess 132 is provided with a shaft support portion 132A that rotatably supports a shaft portion 152 of the pawl 150 and stands out in the recess 132, and a shear pin 132B that stands out from the recess 132 and restricts rotation of the pawl 150 about the shaft support portion 132A.

The second housing portion 125 is formed with a recess 138 that houses the lock ring 190. The recess 138 is formed so as to be open toward the side of the leg plate 16 of the frame 12 (see FIG. 1). A circular opening 140 that is concentric to the axial center of the spool 20 (see FIG. 1) is formed through the recess 138. Moreover, the second housing portion 125 is provided with three lock ring engagement claws 139 that engage with the lock ring 190 disposed inside the recess 138 so as to restrict movement of the lock ring 190 toward the leg plate 16 side.

The body 122 described above is fixed to the outside of the leg plate 16 (see FIG. 1).

The gas generator 194 is formed in a substantially circular cylinder shape. One end portion of the gas generator 194 is configured by a gas ejection section 194A that ejects gas, and another end portion of the gas generator 194 is configured by a wiring connection section 194B that is connected to wiring. The gas generator 194 is inserted into a second cylindrical portion 204B of the cylinder section 204, described later, from the gas ejection section 194A side, and the gas generator 194 is fixed to the cylinder section 204 using a fixing member 195.

The pawl 150 is formed in a block shape using a metal material, and includes a shaft portion 152 with a substantially circular cross-section profile, and an arm 154 and an engaging portion 156 respectively formed so as to extend out toward a radial direction outside of the shaft portion 152. The shaft portion 152 is rotatably supported by the shaft support portion 132A provided to the first housing portion 124 of the body 122. Moreover, the pawl 150 is formed with an anchor hole 158 with a circular cross-section profile. The shear pin 132B provided to the first housing portion 124 of the body 122 is inserted into the anchor hole 158, thereby restricting rotation of the pawl 150 about the shaft support portion 132A. In a state in which the shear pin 132B is inserted into the anchor hole 158, the engaging portion 156 engages with a notch 192 in the lock ring 190, described later. Note that the position of the pawl 150 when in this state is referred to as the "locked position". Moreover, in a state in which the pawl 150 is positioned at the locked position, the arm 154 is disposed in close proximity to a press portion 160C of the piston section 160, described later.

As illustrated in FIG. 4, the lock ring 190 is formed substantially in a ring shape using a metal material. The lock ring 190 is disposed at the peripheral outside of the clutch mechanism 52 and is coaxial to the clutch mechanism 52. Moreover, as illustrated in FIG. 6, an inner peripheral portion of the lock ring 190 is formed with knurled teeth 190A to give a spur gear profile. An outer peripheral portion of the lock ring 190 is formed with the notch 192, which has a substantially triangular cross-section profile, and the notch 192 is open toward a radial direction outside of the lock ring 190. The outer peripheral portion of the lock ring 190 is further formed with three engaged recesses 193, each configured with substantially U-shaped edges. The engaged recesses 193 are open toward the radial direction outside of the lock ring 190. Moreover, the three engaged recesses 193 are disposed separated by mutual gaps in the circumferential direction of the lock ring 190. The three lock ring engagement claws 139 provided to the second housing portion 125 of the body 122 engage with the three respective engaged recesses 193 to restrict movement of the lock ring 190 toward the leg plate 16 side (see FIG. 1). Note that the lock ring 190 described above is supported so as to be rotatable with respect to the body 122 in a state in which the lock ring 190 is housed in the recess 138 formed in the second housing portion 125 of the body 122.

Figure 8A:
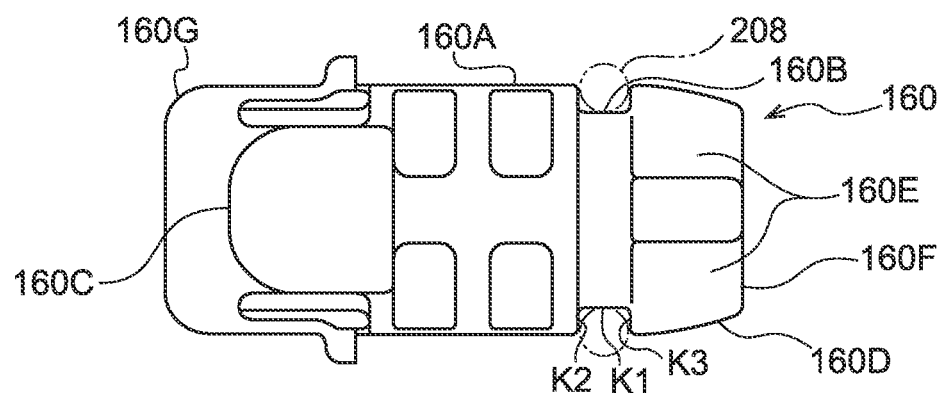
FIG. 8A is a side view from the left, illustrating a piston section configuring part of a force limiter load-switching mechanism.
Figure 8B:
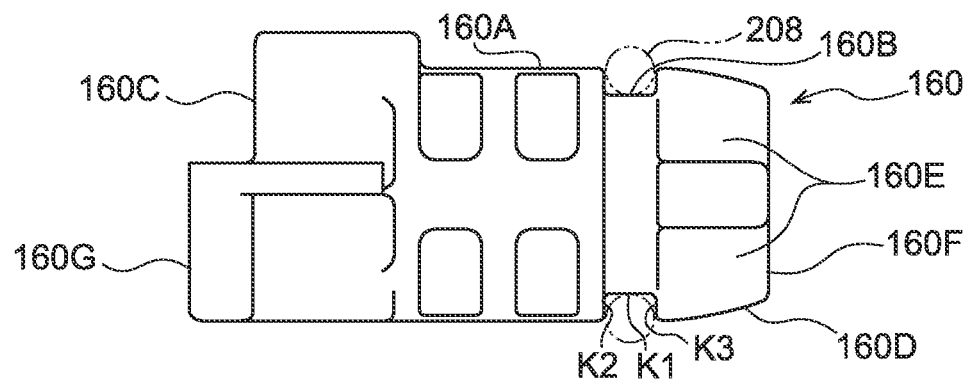
FIG. 8B is a bottom view illustrating a piston section configuring part of a force limiter load-switching mechanism.
Figure 8C:
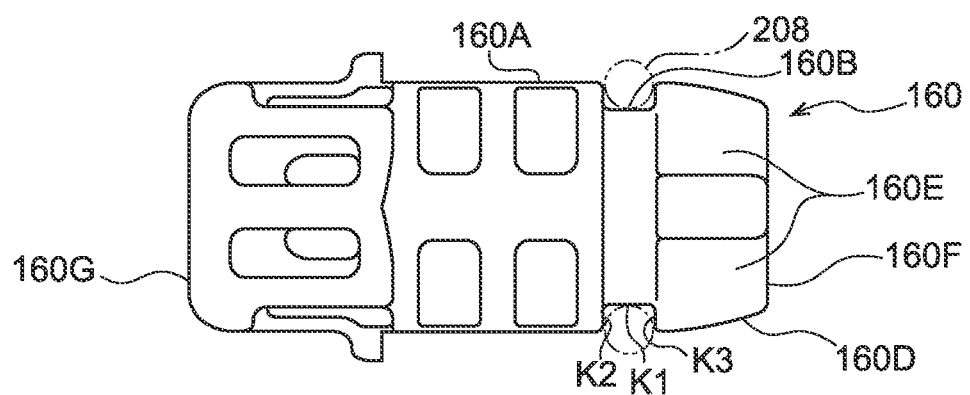
FIG. 8C is a side view from the right, illustrating a piston section configuring part of a force limiter load-switching mechanism.

As illustrated in FIG. 8A to FIG. 8C, the piston section 160 is formed using a resin material. A base end side of the piston section 160 is configured by an insertion portion 160A that is formed in a substantially circular column shape and that is inserted into a first cylindrical portion 204A of the cylinder section 204, described later. An outer peripheral portion of an axial direction intermediate portion of the insertion portion 160A is formed with an O-ring attachment groove 160B, serving as a recessed groove running in the circumferential direction of the piston section 160. The O-ring attachment groove 160B includes a bottom wall K1 and a pair of side walls K2, K3 so as to form a recessed shape opening toward a radial direction outside of the insertion portion 160A. An O-ring 208, serving as a sealing member formed using a viscoelastic material such as rubber, is disposed in a region enclosed by the bottom wall K1 and the pair of side walls K2, K3 of the O-ring attachment groove 160B, thereby attaching the O-ring 208 to the piston section 160. The O-ring 208 prevents gas generated by the gas generator 194 from leaking out between the insertion portion 160A and the first cylindrical portion 204A, described later.

Figure 8D:
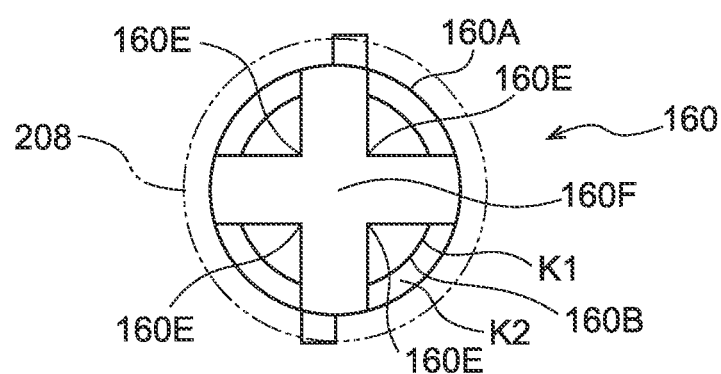
FIG. 8D is a back view illustrating a piston section configuring part of a force limiter load-switching mechanism.

An end portion of the insertion portion 160A on the opposite side to the side provided with the press portion 160C, described later, namely a location closer to the base end side of the insertion portion 160A than the location formed with the O-ring attachment groove 160B, is configured by a tapered section 160D formed so as to gradually taper on progression toward the opposite side to the press portion 160C. The tapered section 160D is formed with four V-shaped grooves 160E, serving as communication portions with substantially V-shaped edges. One end portion of each V-shaped groove 160E is connected to the O-ring attachment groove 160B. In other words, as illustrated in FIG. 8D, the O-ring 208 and the side wall K3 of the O-ring attachment groove 160B do not overlap each other at the locations formed with the V-shaped grooves 160E as viewed from the base end side of the insertion portion 160A. Moreover, an end face of the tapered section 160D on the opposite side to the press portion 160C configures an abutting portion 160F that abuts an abutted portion 204E provided inside the first cylindrical portion 204A, described later.

The press portion 160C that presses the arm 154 of the pawl 150 (see FIG. 6) is provided on a leading end side of the piston section 160. The leading end side of the piston section 160 is also provided with a guide block 160G that is disposed inside the housing groove 130 (see FIG. 6) provided to the first housing portion 124 of the body 122, and that moves along the housing groove 130. The guide block 160G is provided adjacent to the press portion 160C.

As illustrated in FIG. 9A to FIG. 9D, the cylinder section 204 is formed using a metal material. Specifically, the cylinder section 204 includes the first cylindrical portion 204A that is formed in a cylinder shape and into which the insertion portion 160A (see FIG. 8A to FIG. 8D) of the piston section 160 described above is inserted, and the second cylindrical portion 204B that is in communication with the first cylindrical portion 204A and that is internally supplied with gas from the gas generator 194. An inner peripheral face of the first cylindrical portion 204A is formed with a circular cylinder shaped surface profile corresponding to the external profile of the O-ring 208 described above. A location 204C on the second cylindrical portion 204B side of the first cylindrical portion 204A overlaps, in the radial direction, with a location 204D on the first cylindrical portion 204A side of the second cylindrical portion 204B.

Figure 10:
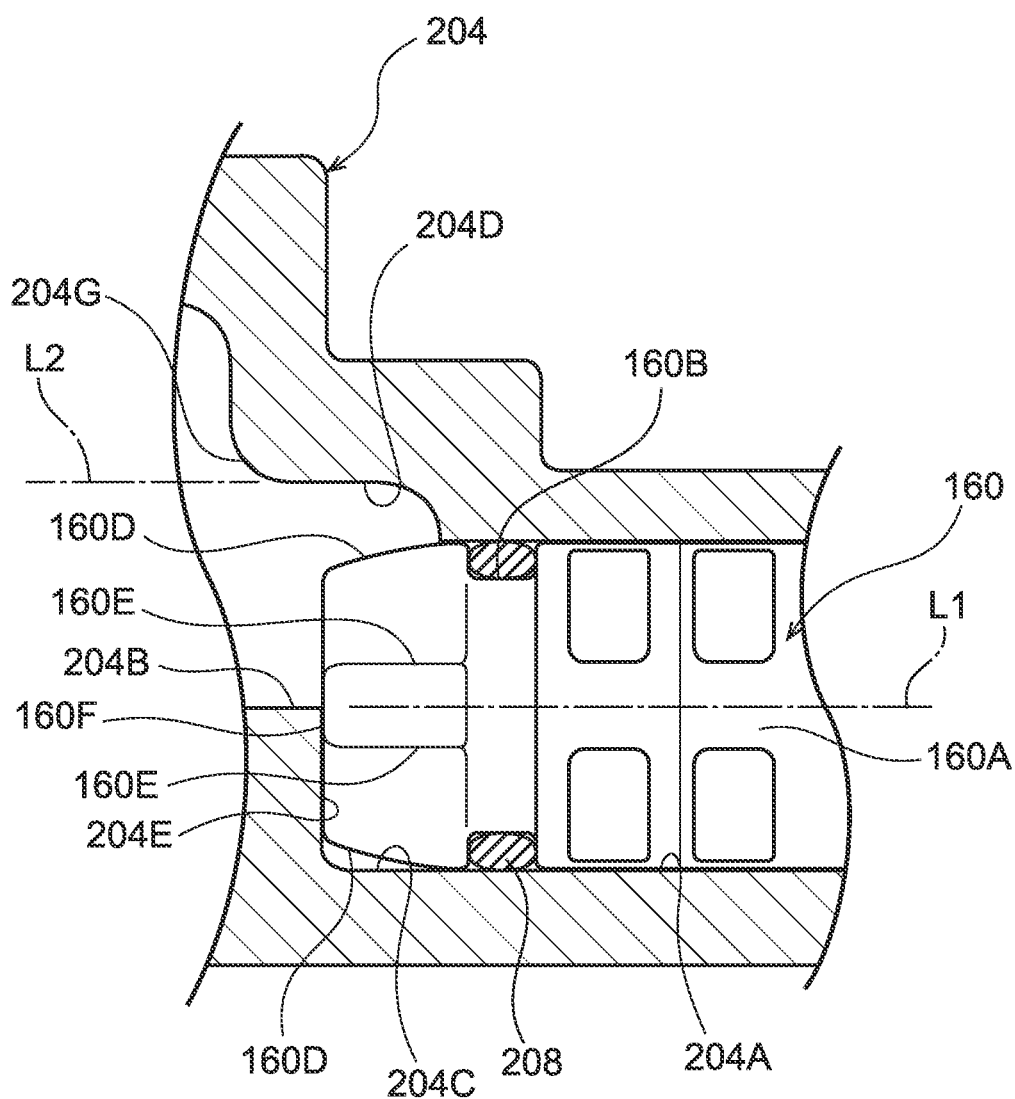
FIG. 10 is an enlarged cross-section illustrating a piston section inserted into a first cylindrical portion of a cylinder section so as to abut an abutted portion of the cylinder section.

An axial center L2 of the second cylindrical portion 204B is disposed offset in the radial direction of the first cylindrical portion 204A with respect to an axial center L1 of the first cylindrical portion 204A. Accordingly, a gas path from the second cylindrical portion 204B to the first cylindrical portion 204A inside the cylinder section 204 is bent in a crank shape. Moreover, as a result of forming the gas path inside the cylinder section 204 in a crank shape, the abutted portion 204E abutted by the abutting portion 160F of the piston section 160a is formed at the boundary between the first cylindrical portion 204A and the second cylindrical portion 204B, namely at an end portion on the second cylindrical portion 204B side of the first cylindrical portion 204A. Moreover, as illustrated in FIG. 10, a state in which the abutting portion 160F of the piston section 160 is abutted against the abutted portion 204E is set as an assembly completion state of the piston section 160 to the cylinder section 204.

Moreover, as illustrated in FIG. 9A to FIG. 9D, an end portion of the second cylindrical portion 204B on the opposite side to the first cylindrical portion 204A is configured by an engaged portion 204F with which the gas generator 194 engages. A location of the second cylindrical portion 204B closer to the first cylindrical portion 204A side than the engaged portion 204F is formed with steps 204G at two locations. The area of the flow path in the second cylindrical portion 204B is thereby set so as to narrow on progression toward the first cylindrical portion 204A side.

Figure 9A:
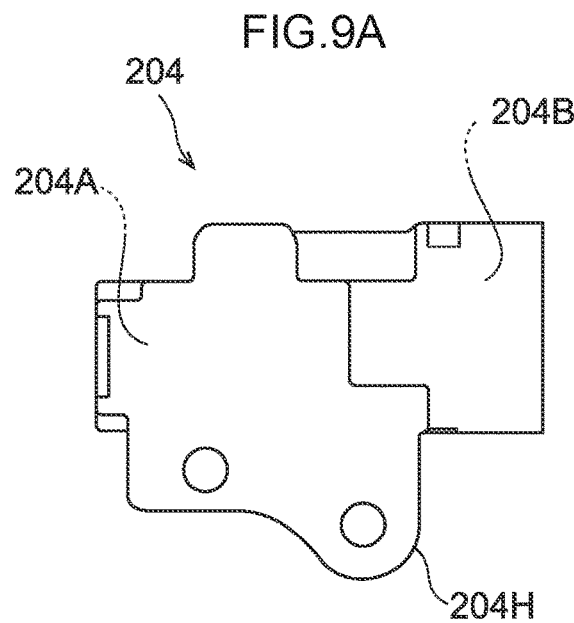
FIG. 9A is a side view from the left, illustrating a cylinder section configuring part of a force limiter load-switching mechanism.
Figure 9B:
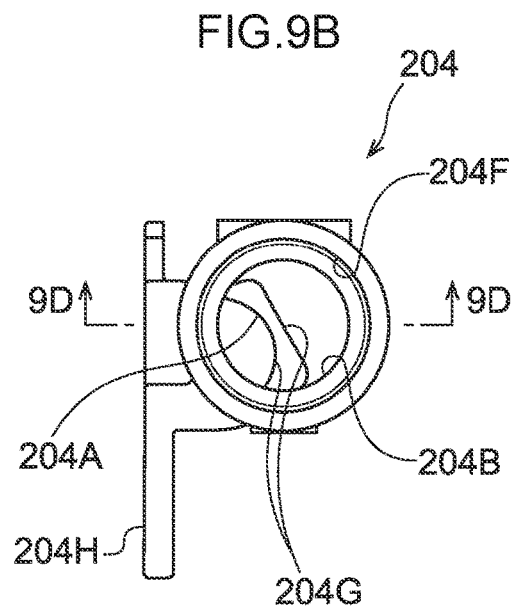
FIG. 9B is a front view illustrating a cylinder section configuring part of a force limiter load-switching mechanism.
Figure 9C:
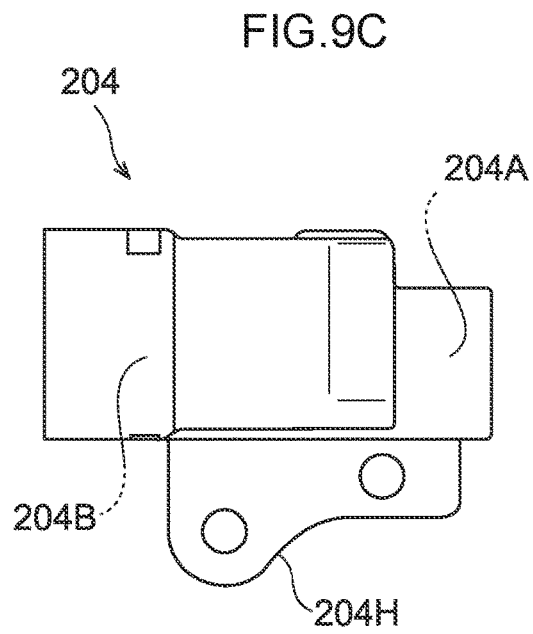
FIG. 9C is a side view from the right, a front view, and another side view from the right, illustrating a cylinder section configuring part of a force limiter load-switching mechanism.
Figure 9D:
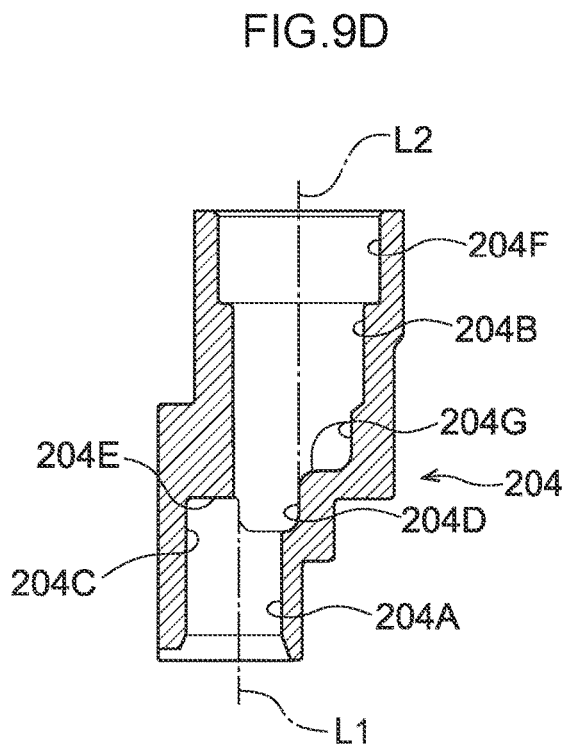
FIG. 9D is a cross-section view illustrating a cross section taken along line 9D-9D of the cylinder section illustrated in FIG. 9B.

As illustrated in FIG. 9A to FIG. 9C, the cylinder section 204 further includes a fixing flange 204H formed in the shape of a tongue plate. The flange 204H is fixed to the body 122, thereby attaching the cylinder section 204 to the body 122.

Operation and Advantageous Effects of the Present Exemplary Embodiment

Next, explanation follows regarding operation and advantageous effects of the present exemplary embodiment.

As illustrated in FIG. 1, in the webbing take-up device 10 according to the present exemplary embodiment, the spool 20, the lock gear 24, the main torsion shaft 32, the sub torsion shaft 44, and the clutch mechanism 52 (including the sleeve 54, the clutch base 82, the clutch plates 100, and the screw 108) are all configured capable of rotating together as a unit in the take-up direction and the pull-out direction. Accordingly, configuration is such that the webbing 22 is worn over the body of the occupant of the vehicle by pulling the webbing 22 out from the spool 20. Moreover, in a state in which the webbing 22 is being worn over the body of the occupant of the vehicle, for example in a state of sudden deceleration of the vehicle, the lock mechanism actuates so as to prevent rotation of the lock gear 24 in the pull-out direction. This thereby limits pull-out direction rotation of the spool 20 that is coupled to the lock gear 24 through the main torsion shaft 32, thus limiting pull-out of the webbing 22 from the spool 20. The body of the occupant attempting to move toward the vehicle front is thus restrained by the webbing 22.

In a state in which pull-out direction rotation of the lock gear 24 is prevented, should the body of the occupant pull on the webbing 22 with an even greater force, such that a rotational force in the pull-out direction acting on the spool 20 as a result of this pulling force exceeds a torsion-withstand load (deformation-withstand load) of the first energy absorption section 38 of the main torsion shaft 32, the force limiter mechanism 31 actuates, and torsion (deformation) of the first energy absorption section 38 permits pull-out direction rotation of the spool 20 at or above a force limiter load of the spool 20 (the torsion-withstand load of the first energy absorption section 38).

Accordingly, a load (burden) acting on the chest of the occupant from the webbing 22 is lessened due to the spool 20 rotating in the pull-out direction and the webbing 22 being pulled out from the spool 20 as a result the first energy absorption section 38 twisting. Moreover, kinetic energy of the occupant pulling the webbing 22 is absorbed in an amount commensurate with the torsion of the first energy absorption section 38.

On the other hand, as described above, rotation of the spool 20 in the pull-out direction with respect to the lock gear 24 means that the lock gear 24 rotates in the take-up direction relative to the spool 20. Accordingly, when the lock gear 24 rotates in the take-up direction relative to the spool 20, the base end portion 40A of the trigger wire 40 is moved in the circumferential direction of the main torsion shaft 32, while to the leading end side of the base end portion 40A, the trigger wire 40 remains inserted through the hole 42 in the spool 20. Accordingly, to the leading end side of the base end portion 40A, the trigger wire 40 is pulled toward the lock gear 24 side with respect to the hole 42.

The leading end portion 40B of the trigger wire 40 is thus pulled out of the hole 65 in the clutch guide 64 and the hole 91 in the clutch cover 88, and a state in which rotation of the clutch guide 64 relative to the spool 20 and the clutch cover 88 is prevented is released.

The clutch guide 64 is then rotated from the non-actuated position to the actuated position by the urging force of the coil springs 98. When this occurs, the spacing between the holes 89 in the clutch cover 88 (swing shafts 106 of the clutch plates 100) and the coupling walls 74 of the clutch guide 64 becomes shorter, and a leading end of the circular arc portion 104 of each clutch plate 100 is pressed (guided) in a direction tangential to the clutch guide 64 by the corresponding coupling wall 74. The clutch plates 100 are thus swung toward the lock ring 190 side (see arrows R in FIG. 5A), and the knurled teeth 104A of the clutch plates 100 mesh together with the knurled teeth 190A of the lock ring 190 (the state illustrated in FIG. 5B). The clutch plates 100 and the lock ring 190 are thereby joined together. Moreover, when this occurs, each anchor portion 86 formed to the clutch base 82 presses a base end portion of the arm 102 of the corresponding clutch plate 100 in the pull-out direction, such that the clutch plates 100 are pressed against the lock ring 190, thus maintaining the joined state between the two. Accordingly, the lock ring 190 attempts to rotate in the pull-out direction together with the pull-out direction rotation of the clutch mechanism 52 (the sleeve 54, the clutch base 82, and the clutch plates 100).

Furthermore, a controller, not illustrated in the drawings, determines whether or not the physical build of the occupant is a predetermined reference value or greater, based on a signal from a physical build detection device, and also determines whether or not the vehicle has been involved in a collision, based on a signal from a collision detection device. In cases in which the controller determines the physical build of the occupant to be the predetermined reference value or greater, the gas generator 194 illustrated in FIG. 6 and FIG. 7 is not actuated, and so the engaging portion 156 of the pawl 150 is disposed at the locked position, engaged with the notch 192 of the lock ring 190. Accordingly, rotation of the lock ring 190 in the pull-out direction is locked (prevented), thereby preventing pull-out direction rotation of the clutch mechanism 52 (the sleeve 54, the clutch base 82, and the clutch plates 100).

Then, as illustrated in FIG. 1, in the state in which pull-out direction rotation of the sleeve 54 is prevented, if the body of the occupant pulls on the webbing 22 with an even greater force, such that a rotational force acting on the spool 20 in the pull-out direction as a result of this pulling force exceeds the sum of the torsion-withstand load (deformation-withstand load) of the first energy absorption section 38 of the main torsion shaft 32 and a torsion-withstand load (deformation-withstand load) of the second energy absorption section 50 of the sub torsion shaft 44, the first energy absorption section 38 and the second energy absorption section 50 twist (deform) so as to permit pull-out direction rotation of the spool 20 at or above the force limiter load (the sum of the torsion-withstand load of the first energy absorption section 38 and the torsion-withstand load of the second energy absorption section 50).

Accordingly, a load (burden) acting on the chest of the occupant from the webbing 22 is lessened due to the spool 20 rotating in the pull-out direction and the webbing 22 being pulled out from the spool 20 as a result of the first energy absorption section 38 and the second energy absorption section 50 twisting. Moreover, kinetic energy of the occupant pulling the webbing 22 is absorbed in an amount commensurate with the torsion of the first energy absorption section 38 and the second energy absorption section 50.

On the other hand, when, based on the signal from the physical build detection device, the controller determines the physical build of the occupant to be less than the predetermined reference value, and based on the signal from the collision detection device, the controller determines that the vehicle has been involved in a collision, the gas generator 194 illustrated in FIG. 6 and FIG. 7 is actuated under the control of the controller.

On actuation of the gas generator 194, gas ejected through the gas ejection section 194A of the gas generator 194 is supplied into the second cylindrical portion 204B of the cylinder section 204, and the pressure inside the second cylindrical portion 204B and inside the first cylindrical portion 204A that is in communication with the second cylindrical portion 204B rises. The piston section 160 provided inside the first cylindrical portion 204A therefore moves along the inside of the first cylindrical portion 204A. The press portion 160C of the piston section 160 that has been moved presses the arm 154 of the pawl 150. This results in shearing of the shear pin 132B inserted through the anchor hole 158 in the pawl 150, thereby rotating the pawl 150 about the shaft support portion 132A. The engagement between the engaging portion 156 of the pawl 150 and the notch 192 of the lock ring 190 is thus released (the position of the pawl 150 when in this state is referred to as the "released position"). Rotation of the lock ring 190 in the pull-out direction is permitted as a result, thus enabling pull-out direction rotation of the lock ring 190 together with the clutch mechanism 52 (the sleeve 54, the clutch base 82, and the clutch plates 100) and the spool 20. Since torsion of the second energy absorption section 50 does not occur, pull-out direction rotation of the spool 20 is permitted at or above the force limiter load (torsion-withstand load of the first energy absorption section 38) as a result of the first energy absorption section 38 twisting (deforming).

Namely, in cases in which the physical build of the occupant is the predetermined reference value or greater, the force limiter load is set to the sum of the torsion-withstand load of the first energy absorption section 38 and the torsion-withstand load of the second energy absorption section 50. Namely, a load value of the force limiter load is set to a high load. On the other hand, in cases in which the physical build of the occupant is below the predetermined reference value and a vehicle collision has been detected, the force limiter load is set to the torsion-withstand load of the first energy absorption section 38. Namely, the load value of the force limiter load is set to a low load. This thereby enables appropriate protection according to the physical build of the occupant.

Note that in the present exemplary embodiment, as illustrated in FIG. 10, the state in which the abutting portion 160F of the piston section 160 is abutted against the abutted portion 204E provided to the cylinder section 204 is set as the assembly completion state of the piston section 160 to the cylinder section 204. Making such a setting enables the volume of a space between the piston section 160 and the gas generator 194 inside the cylinder section 204 to be made consistent, thereby enabling pressure increase characteristics inside the cylinder section 204 during actuation of the gas generator 194 to be made consistent. This thereby enables an actuation force of the piston section 160 (load input to the pawl 150 from the piston section 160) to be made consistent.

Moreover, in the present exemplary embodiment, since excessive variation does not arise in the volume of the space between the piston section 160 and the gas generator 194 inside the cylinder section 204, there is no need to set the output of the gas generator 194 so as to take into account such excessive variation in volume. Namely, the output of the gas generator 194 need not be raised so as to take into account such excessive variation in volume. This thereby enables an increase in the size of the gas generator 194 to be suppressed, and therefore enables an increase in the size of the force limiter load-switching mechanism 120 to be suppressed.

Moreover, in the present exemplary embodiment, a location of the insertion portion 160A of the piston section 160 closer to the base end side than the location formed with the O-ring attachment groove 160B is configured by the tapered section 160D formed so as to gradually taper on progression toward the opposite side to the press portion 160C. This thereby enables gas from the gas generator 194 that has flowed from the second cylindrical portion 204B into the first cylindrical portion 204A to flow swiftly toward the O-ring 208 side, enabling the speed of the pressure increase in the vicinity of the O-ring 208 on actuation of the gas generator 194 to be accelerated. As a result, it is possible to swiftly deform the O-ring 208 (deform the O-ring 208 so as to be squashed along the axial direction of the insertion portion 160A of the piston section 160) when the gas generator 194 is actuated, enabling the gas sealing properties of the O-ring 208 to be raised.

Moreover, in the present exemplary embodiment, the tapered section 160D is formed with the four V-shaped grooves 160E. Gas from the gas generator 194 that has flowed from the second cylindrical portion 204B into the first cylindrical portion 204A is thus able to flow swiftly through the four V-shaped grooves 160E formed in the tapered section 160D and into the O-ring attachment groove 160B into which the O-ring 208 is fitted, thereby enabling the speed of the pressure increase in the vicinity of the O-ring 208 on actuation of the gas generator 194 to be accelerated. As a result, it is possible to swiftly deform the O-ring 208 (deform the O-ring 208 so as to be squashed along the axial direction of the insertion portion 160A of the piston section 160) when the gas generator 194 is actuated, enabling the gas sealing properties of the O-ring 208 to be raised.

Moreover, in the present exemplary embodiment, the flow path area of the second cylindrical portion 204B into which gas is supplied from the gas generator 194 is set so as to become narrower on progression toward the first cylindrical portion 204A side. This thereby enables gas from the gas generator 194 to flow swiftly into the first cylindrical portion 204A. It is therefore possible to reduce the amount of time taken until the piston section 160 begins to move after the actuation of the gas generator 194 starts.

Note that in the present exemplary embodiment, although explanation has been given regarding an example in which the flow path area of the second cylindrical portion 204B into which gas is supplied from the gas generator 194 is set so as to become narrower on progression toward the first cylindrical portion 204A side, the present invention is not limited thereto. Whether or not to set the flow path area of the second cylindrical portion 204B in the above manner may be determined as appropriate in consideration of such factors as the volume of the space between the piston section 160 and the gas generator 194 inside the cylinder section 204.

Moreover, in the present exemplary embodiment, explanation has been given regarding an example in which the piston section 160 is provided with the tapered section 160D, and the tapered section 160D is provided with the V-shaped grooves 160E. However, the present invention is not limited thereto. Whether or not to provide the piston section 160 with the tapered section 160D and the V-shaped grooves 160E may be determined as appropriate in consideration of such factors as the sealing properties of the O-ring 208.

Temporary Retention Structure of the Clutch Mechanism 52

Figure 11:
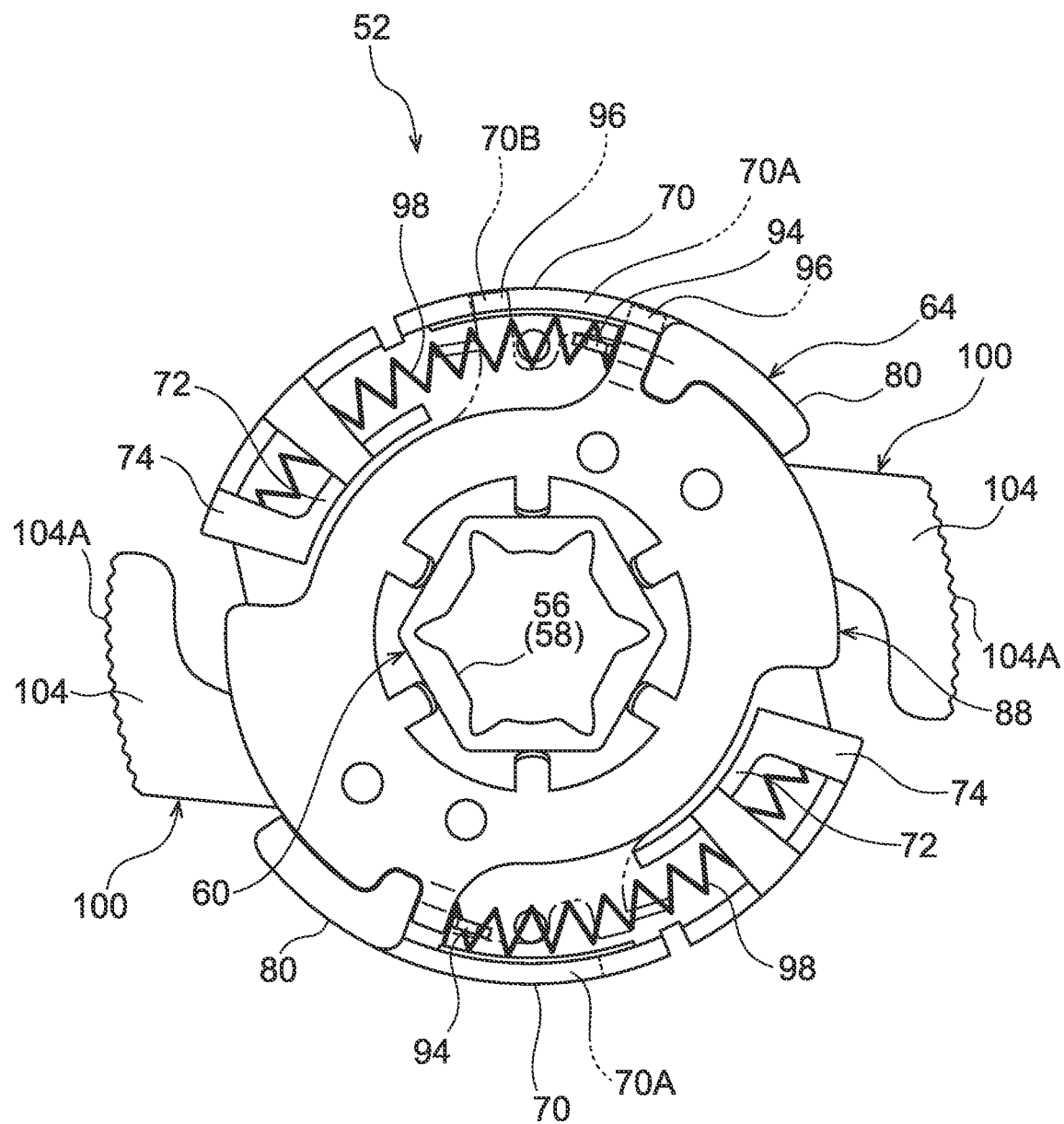
FIG. 11 is a front view illustrating a clutch mechanism on completion of assembly.

Next, explanation follows regarding a temporary retention structure of the clutch mechanism 52 of the present exemplary embodiment, with reference to FIG. 11 and FIG. 12.

As illustrated in FIG. 11, in the clutch mechanism 52 of the present exemplary embodiment, the guide claw 96 of the clutch cover 88 is disposed inside the guide hole 70A provided to the clutch guide 64, and the guide claw 96 moves along the guide hole 70A, such that the clutch guide 64 is capable of rotating relative to the clutch cover 88 between the actuated position illustrated in FIG. 5B and the non-actuated position illustrated in FIG. 4.

During an assembly process of the webbing take-up device 10, the leading end portion 40B of the trigger wire 40 (see FIG. 1) is inserted into the holes 65, 91 (see FIG. 1) formed in the clutch guide 64 and the clutch cover 88 (a trigger wire insertion process). The clutch guide 64 is thereby held at the non-actuated position.

Note that as illustrated in FIG. 11, in an assembled state of the clutch mechanism 52, the clutch guide 64 is disposed at the actuated position under the urging force of the pair of coil springs 98. Accordingly, the knurled teeth 104A of the clutch plates 100 adopt a state projecting out closer toward the outside than an outer peripheral portion of the clutch guide 64.

However, in consideration of such factors as the ease of a trigger wire insertion process, it is desirable for the clutch mechanism 52 to be brought to the trigger wire insertion process manufacturing line in a state in which the clutch guide 64 has been positioned at the non-actuated position.

Figure 12A:
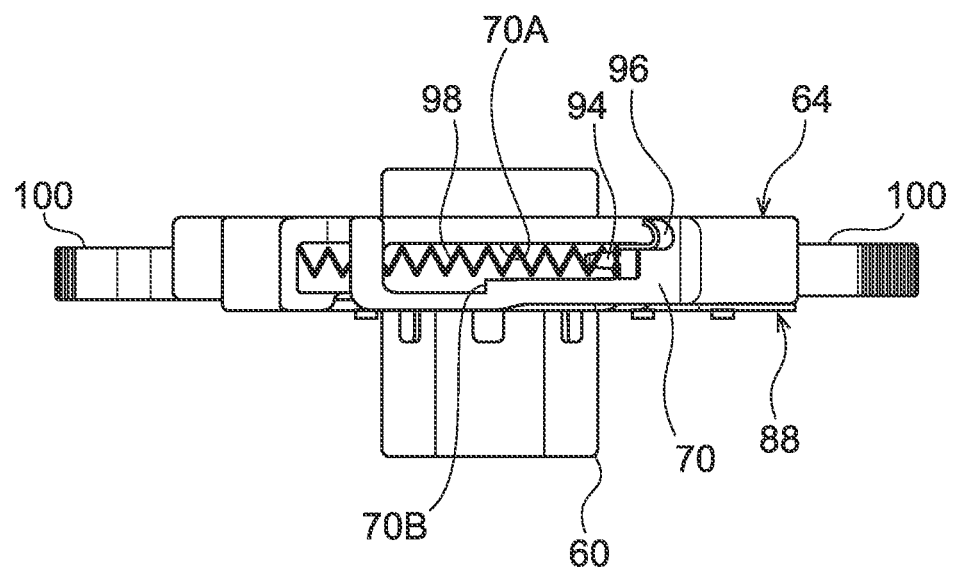
FIG. 12A is a side view illustrating the clutch mechanism illustrated in FIG. 11 on completion of assembly.
Figure 12B:
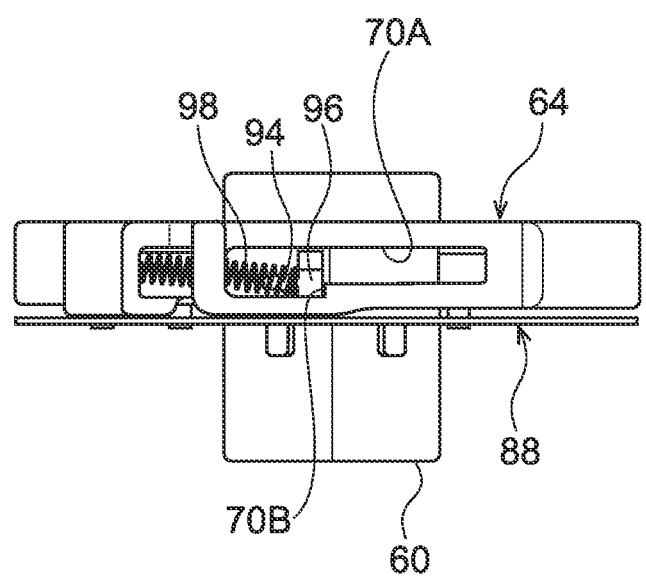
FIG. 12B is a side view illustrating a temporarily retained state of a clutch mechanism in a state in which clutch plates are housed in clutch plate housing portions.

Accordingly, in the present exemplary embodiment, as illustrated in FIG. 12A and FIG. 12B, an anchor portion 70B to anchor the guide claw 96 of the clutch cover 88 is provided at a portion inside the guide hole 70A provided to the clutch guide 64. Anchoring the guide claw 96 of the clutch cover 88 to the anchor portion 70B retains the clutch guide 64 in a state disposed at the non-actuated position. Note that after performing the trigger wire insertion process, the guide claw 96 may be moved so as to release the engagement between the guide claw 96 and the anchor portion 70B.

As described above, the present exemplary embodiment enables the ease of operation to be improved in the trigger wire insertion process by providing the temporary retention structure described above.

Explanation has been given regarding one exemplary embodiment of the present invention. However, the present invention is not limited thereto, and obviously various other modifications may be implemented within a range not departing from the spirit of the present invention.

The disclosure of Japanese Patent Application No. 2015-077660, filed on Apr. 6, 2015, is incorporated in its entirety by reference herein.

The invention claimed is:

1. A webbing take-up device comprising:
   a spool on which a webbing worn by an occupant is taken up, and that is rotated in a pull-out direction by the webbing being pulled out;
   a lock section that restricts pull-out direction rotation of the spool in a vehicle emergency;
   a force limiter mechanism that permits pull-out direction rotation of the spool at or above a force limiter load when the lock section has restricted pull-out direction rotation of the spool;
   a switching member that switches the force limiter load by being displaced;
   a cylinder section that includes a first cylindrical portion formed in a cylinder shape, a second cylindrical portion having an axial center disposed offset with respect to an axial center of the first cylindrical portion, the second cylindrical portion being in communication with the first cylindrical portion, and an abutted portion provided at a boundary between the first cylindrical portion and the second cylindrical portion;
   a gas generator that is actuated to supply gas into the second cylindrical portion; and
   a piston section that is disposed inside the first cylindrical portion in a state abutted against the abutted portion, that is moved along the first cylindrical portion by the gas generator being actuated and pressure inside the second cylindrical portion and the first cylindrical portion increasing, and that presses and displaces the switching member,
   wherein an end portion of the piston section on a first cylindrical side portion abuts against the abutted portion of the cylinder section.

2. The webbing take-up device of claim 1, wherein the end portion of the piston section immovably abuts against the abutted portion of the piston section.

3. A webbing take-up device comprising:
   a spool on which a webbing worn by an occupant is taken up, and that is rotated in a pull-out direction by the webbing being pulled out;
   a lock section that restricts pull-out direction rotation of the spool in a vehicle emergency;
   a force limiter mechanism that permits pull-out direction rotation of the spool at or above a force limiter load when the lock section has restricted pull-out direction rotation of the spool;
   a switching member that switches the force limiter load by being displaced;
   a cylinder section that includes a first cylindrical portion formed in a cylinder shape, a second cylindrical portion having an axial center disposed offset with respect to an axial center of the first cylindrical portion, the second cylindrical portion being in communication with the first cylindrical portion, and an abutted portion provided at a boundary between the first cylindrical portion and the second cylindrical portion;
   a gas generator that is actuated to supply gas into the second cylindrical portion; and
   a piston section that is disposed inside the first cylindrical portion in a state abutted against the abutted portion, that is moved along the first cylindrical portion by the gas generator being actuated and pressure inside the second cylindrical portion and the first cylindrical portion increasing, and that presses and displaces the switching member,
   wherein a sealing member that forms a seal between the piston section and the first cylindrical portion, and that is formed using an elastic material, is attached to an outer peripheral portion of the piston section; and the piston section is tapered at a location of the piston section closer to the abutted portion side than a portion to which the sealing member is attached.

4. A webbing take-up device comprising:
a spool on which a webbing worn by an occupant is taken up, and that is rotated in a pull-out direction by the webbing being pulled out;
a lock section that restricts pull-out direction rotation of the spool in a vehicle emergency;
a force limiter mechanism that permits pull-out direction rotation of the spool at or above a force limiter load when the lock section has restricted pull-out direction rotation of the spool;
a switching member that switches the force limiter load by being displaced;
a cylinder section that includes a first cylindrical portion formed in a cylinder shape, a second cylindrical portion having an axial center disposed offset with respect to an axial center of the first cylindrical portion, the second cylindrical portion being in communication with the first cylindrical portion, and an abutted portion provided at a boundary between the first cylindrical portion and the second cylindrical portion;
a gas generator that is actuated to supply gas into the second cylindrical portion; and
a piston section that is disposed inside the first cylindrical portion in a state abutted against the abutted portion, that is moved along the first cylindrical portion by the gas generator being actuated and pressure inside the second cylindrical portion and the first cylindrical portion increasing, and that presses and displaces the switching member,
wherein an outer peripheral portion of the piston section is formed with a recessed groove, into which a sealing member, that forms a seal between the piston section and the first cylindrical portion and that is formed using an elastic material, is fitted; and the piston section is provided with a communication portion closer to the abutted portion side than a location formed with the recessed groove, the communication portion being in communication with the recessed groove and allowing gas from the gas generator to pass through.

* * * * *